(12) United States Patent
Roche

(10) Patent No.: US 10,803,669 B1
(45) Date of Patent: Oct. 13, 2020

(54) RULE-BASED AUGMENTATION OF A PHYSICAL ENVIRONMENT

(71) Applicant: Amazon Technologies, Inc., Seattle, WA (US)

(72) Inventor: Kyle Roche, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/216,227

(22) Filed: Dec. 11, 2018

(51) Int. Cl.
  *G06T 19/00* (2011.01)
  *G06K 9/00* (2006.01)
  *G06F 3/0481* (2013.01)

(52) U.S. Cl.
  CPC ........ *G06T 19/006* (2013.01); *G06F 3/04815* (2013.01); *G06K 9/00201* (2013.01)

(58) Field of Classification Search
  None
  See application file for complete search history.

(56) References Cited

U.S. PATENT DOCUMENTS

| | | | |
|---|---|---|---|
| 9,183,676 B2 | 11/2015 | McCulloch et al. | |
| 9,984,499 B1 | 5/2018 | Jurgenson et al. | |
| 10,375,009 B1* | 8/2019 | Fishman | G06Q 10/101 |
| 10,675,766 B1 | 6/2020 | Niemeyer et al. | |
| 2010/0007665 A1 | 1/2010 | Smith et al. | |
| 2011/0216179 A1 | 9/2011 | Dialameh et al. | |
| 2012/0210255 A1* | 8/2012 | Ooi | G06T 19/006 715/762 |
| 2012/0249797 A1 | 10/2012 | Haddick et al. | |
| 2012/0274745 A1 | 11/2012 | Russell | |
| 2013/0044129 A1 | 2/2013 | Latta et al. | |
| 2013/0084970 A1 | 4/2013 | Geisner et al. | |
| 2013/0095924 A1 | 4/2013 | Geisner et al. | |
| 2013/0215235 A1 | 8/2013 | Russell | |
| 2013/0342570 A1* | 12/2013 | Kinnebrew | G09G 3/003 345/633 |
| 2014/0002444 A1* | 1/2014 | Bennett | G06F 3/012 345/419 |
| 2014/0049559 A1* | 2/2014 | Fleck | G03H 1/2249 345/633 |
| 2014/0063065 A1* | 3/2014 | Nishikawa | G06T 19/006 345/633 |
| 2014/0146394 A1 | 5/2014 | Tout et al. | |
| 2015/0206343 A1 | 7/2015 | Mattila et al. | |
| 2016/0027051 A1 | 1/2016 | Gross | |
| 2016/0182877 A1 | 6/2016 | Deluca | |

(Continued)

*Primary Examiner* — Ryan M Gray
(74) *Attorney, Agent, or Firm* — BakerHostetler

(57) ABSTRACT

A group of available virtual objects may each have a respective rule set that indicates how a corresponding available virtual object may be used to augment a physical environment. In some examples, the rule sets may be determined based at least in part on sample images that show approved settings or locations for the available virtual objects. To augment a physical space, one or more characteristics of the physical space may be determined, such as contexts, surface characteristics, and others. The rule sets for the available virtual objects may then be compared to the characteristics of the physical space to determine approved virtual objects that are approved for use to augment the physical space. A selected virtual object may then be selected from the approved virtual objects and inserted into a view of the physical space to create an augmented view of the physical space.

18 Claims, 9 Drawing Sheets

(56) References Cited

U.S. PATENT DOCUMENTS

| | | | |
|---|---|---|---|
| 2016/0330522 A1* | 11/2016 | Newell | G06F 21/604 |
| 2017/0124713 A1* | 5/2017 | Jurgenson | G06T 19/006 |
| 2017/0221272 A1 | 8/2017 | Li et al. | |
| 2017/0323481 A1 | 11/2017 | Tran et al. | |
| 2018/0018827 A1* | 1/2018 | Stafford | A63F 13/211 |
| 2018/0157820 A1 | 6/2018 | Adams et al. | |
| 2018/0191831 A1 | 7/2018 | Wadley et al. | |
| 2018/0350137 A1 | 12/2018 | Skidmore et al. | |
| 2018/0376205 A1* | 12/2018 | Oswal | G06F 16/783 |
| 2019/0108686 A1* | 4/2019 | Spivack | G06F 3/011 |
| 2019/0206134 A1 | 7/2019 | Devam et al. | |
| 2019/0272136 A1 | 9/2019 | Lohse et al. | |
| 2019/0371028 A1 | 12/2019 | Harrises et al. | |
| 2020/0118342 A1 | 4/2020 | Varshney et al. | |

\* cited by examiner

RULE-BASED AUGMENTATION OF A PHYSICAL ENVIRONMENT

CROSS-REFERENCE TO RELATED APPLICATIONS

This application is related to the following application, which is hereby incorporated by reference in its entirety: U.S. patent application Ser. No. 16/216,757 filed Dec. 11, 2018, entitled "RULE-BASED AUGMENTATION OF A PHYSICAL ENVIRONMENT".

BACKGROUND

In recent years, the ability to change and enhance a person's perception of an environment has increased rapidly. In particular, one quickly expanding area of technology relates to augmented reality, in which a perception of a real-world environment is augmented by computer-generated information, such as by inserting computer-generated graphics (e.g., one or more virtual objects) into a view of a physical space. In some examples, images and/or video of a physical space, such as a particular room or outdoor setting, may be captured using a camera. An image may then be augmented, such as by inserting one or more virtual objects into the image to overlay various locations within the image. In some other examples, a view of a physical space may be augmented by overlaying one or more virtual objects over a view of a physical space itself, such as by displaying the virtual objects on an eyeglass or other translucent display. These and other view augmentation technologies may serve a wide variety of applications, such as gaming, training, education, industrial design, interior decorating and design, real estate and architectural design and many others.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
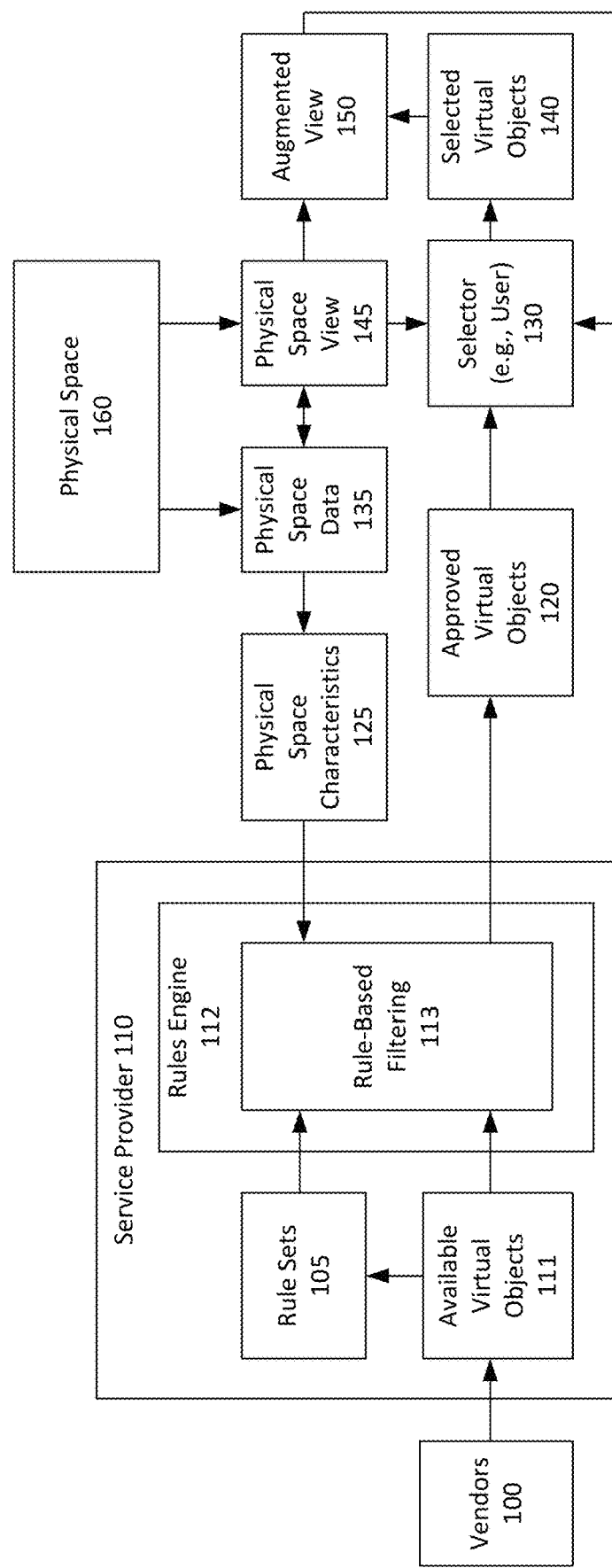
FIG. 1 is a diagram illustrating an example rule-based view augmentation system that may be used in accordance with the present disclosure.

Various techniques for rule-based augmentation of a physical environment are described herein. In particular, in some examples, a service provider may receive data associated with virtual objects from third parties, such as vendors. In some cases, the received data may be used to generate computer graphics information for rendering the virtual objects. As described in detail below, the service provider may provide various services relating to augmented reality technology. In particular, the service provider may facilitate use of the virtual objects to augment views of a physical space, such as in an augmented reality context. In some examples, vendors may provide information indicating how they want the virtual objects to be used in the augmented reality context. For example, a vendor may provide information indicating characteristics of an approved location at which the virtual object may be inserted or rendered in an augmented reality view. In one specific example, a vendor may provide one or more sample images that show a physical object that is similar or identical to, or that otherwise represents or corresponds to, the virtual object. The sample images may depict sample settings or locations at which the vendor approves of using the physical object, which in turn may be used to determine approved settings or locations at which the corresponding virtual object may be used.

In some examples, the service provider may use information from a vendor to determine a rule set for a respective virtual object. The rule set may include one or more rules for using the respective virtual object in the augmented reality context. For example, one or more of the rules may indicate an approved context for the virtual object (e.g., kitchen, den, classroom, office, sporting event, party, outdoors, etc.). One or more rules may also indicate an approved surface for the virtual object (e.g., surface type, surface size, surface shape, surface orientation, surface height, etc.). For example, a rule may indicate that a virtual object should be placed on a highest detected horizontal surface having at least a particular size (e.g. 5×10 inches, etc.), shape (e.g., rectangular, circular, etc.), and/or type (e.g., table, desk, bookshelf, etc.) in a particular room (e.g., kitchen, den, office, etc.). One or more rules may also indicate approved relationships to other objects in a physical space. For example, a rule may indicate that a virtual object should, or should not, be depicted within a particular distance of one or more other particular physical or virtual objects. As a specific example, a rule may indicate that a virtual object may be placed on a closest horizontal plane to any detected currency (e.g., dollar bill or credit card) in a room. Another rule may indicate that a virtual object may not be placed within 5 meters of a television, door and/or window.

Upon being determined, the rule sets may be provided to a rules engine, for example that compares the rule sets to characteristics of a physical space in order to assist in augmentation of the physical space with the virtual objects. In particular, in some examples, data representative of a physical space may be received. For example, a camera may be used to capture one or more images and/or other data of a physical space. The received data may then be analyzed to determine one or more characteristics of the physical space. For example, in some cases, the images and/or data may be provided to an object recognition service, such as may be operated by the service provider. The object recognition service may analyze the images and/or data to recognize various objects within the physical space, such as faces, furniture, doors, windows, pictures, appliances, buildings, vehicles, elements of nature (trees, rivers, clouds, etc.), and the like. Based at least in part on the recognized objects, one or more contexts associated with the physical space may then be determined. For example, it may be determined that a physical space including a refrigerator and a sink is associated with a kitchen context, that a physical space including a television and a couch is associated with a den context, and that a physical space with a computer, desk and chair is associated with an office context. As another example, images and/or data may be analyzed using one or more surface detection techniques to detect locations and characteristics of surfaces within a physical space. For example, characteristics such as a location, type, size, shape, orientation, and height of one or more surfaces in the physical space may be determined. As yet another example, images and/or data may be analyzed using one or more distance and/or scaling detection techniques to determine distances between various objects in the physical space, as well as object depths, heights, and other distances or measurements.

Upon determining the characteristics of a physical space, the characteristics may be provided to the rules engine, which may compare the characteristics to the rule sets of the virtual objects to determine which virtual objects are suitable for various locations within the physical space. For example, using object recognition techniques, it may be determined that a physical space includes a television and a couch—and that the physical space therefore is a den. Also, using surface detection techniques, a particular surface may be identified within the physical space, and the surface may be determined to have an area of 5×5 feet. It may also be determined that the surface is 3 feet from the couch. These characteristics may then be compared to the rule sets to determine a group of approved virtual objects having corresponding rules sets that are satisfied by the characteristics of the surface. In some examples, indications of the virtual objects that are approved for the surface may be provided to a user. For example, in some cases, it may be determined that a virtual coffee mug and a virtual flowerpot have been approved for placement on the surface. The user may then be informed that the virtual coffee mug and the virtual flowerpot are approved, and the user may be permitted to select the virtual coffee mug and/or the virtual flowerpot for placement on the surface. Upon being selected for placement on the surface, the virtual coffee mug and/or virtual flowerpot may be inserted into a view of the physical space, such as by being rendered into an image of the physical space, by being rendered onto a translucent display (e.g., eyeglasses) through which the physical space is viewed, or by other means. By contrast, other virtual objects whose rule sets are not satisfied by the characteristics of the surface may not be approved for surface, and the user may not be permitted to select those objects for placement on the surface. For example, a virtual speaker may be approved only for surfaces that have an area greater than 6×6 feet—and may therefore not be approved for the surface, which is only 5×5 feet. As another example, a virtual toaster oven may be approved only for placement in a kitchen—and may therefore not be approved for the surface, which is in a den instead of a kitchen. As yet another example, a virtual lighting fixture may be approved only for surfaces that are within 2 feet from a couch—and may therefore not be approved for the surface, which is 3 feet away from the couch.

The ability to provide rule-based filtering of virtual objects for augmenting a view of a physical space, as described herein, may provide a number of advantages. In particular, the rule sets may allow vendors to have greater control and flexibility over the use of their associated virtual objects, such as the ability to control within which environments their associated objects are used. For example, the rule sets may allow vendors to ensure that their virtual objects are not used in environments that would reduce the perceived value or quality or of the objects—or would make the objects appear not to work or function properly. For example, rendering a virtual object at a location that is too big or too small for the object may distort the appearance of the object (e.g., by making the object appear overly tiny or bulky or otherwise disproportional), make the object appear to not work properly (e.g., by obscuring or distorting the appearance of various parts, components, etc.), may block or distort the surrounding location, or may otherwise degrade or interfere with the perception of the object and the environment. Moreover, the rule-based filtering techniques may allow vendors to prevent their virtual objects from being used in association with other objects that may alter or harm the perceived functionality or reputation of the objects. For example, a rule set for a virtual cigarette pack could ensure that the cigarette pack is rendered only in adult contexts, such as bars or casinos or near beer cans, slot machines or ashtrays—and not in child-related contexts, such as classrooms, playgrounds, and the like. Additionally, the rule-based techniques described herein may improve efficiency and reliability for users, such as by selecting, for the users, a group of virtual objects that are approved and suitable for a particular location, while filtering out virtual objects that are disapproved and unsuitable for a particular virtual location. This may save users from the time required to attempt to manually insert a virtual object into a particular location on an object-by-object basis, and to manually determine that the virtual object is too big or too small or otherwise unsuitable for the location. This may also reduce processing time and occurrence of errors related to rendering virtual objects that are too big, too small or otherwise unsuitable for a particular location.

Referring now to FIG. 1, an example rule-based view augmentation system will now be described in detail. In the example of FIG. 1, vendors 100 may provide data associated with available virtual objects 111 to service provider 110. The available virtual objects 111 may, for example, include computer generated graphics that represent or depict of various products, consumer goods, people or animals, structures, elements of nature, or other items or objects. In some examples, the available virtual objects 111 may include graphics that represent physical objects that are sold or distributed by the vendors 100. However, there is no requirement that the vendors 100 must sell or distribute any such physical objects. There is also no requirement that any or all of available virtual objects 111 must necessarily represent a corresponding physical object that exists in the real world. In some examples, the vendors 100 may provide computer graphics information for rendering the available virtual objects 111. In other examples, the vendors 100 may provide sample images of physical objects that are represented by the available virtual objects 111, and the service provider 110 may generate computer graphics information for rendering the virtual objects based on the provided sample images. Various other techniques may also be employed for generating the available virtual objects 111, such as based on descriptions of the available virtual objects or other data and/or metadata.

As also shown in FIG. 1, rule sets 105 may include rules for using the available virtual objects 111 in the augmented reality context. In some examples, each available virtual object 111 may have a respective rule set 105. The respective rule set 105 may include rules indicating characteristics of a suitable physical space in which the corresponding available virtual object 111 is approved for use. For example, one or more of the rules may indicate an approved context for the virtual object (e.g., kitchen, den, classroom, office, sporting event, party, outdoors, etc.). One or more rules may also indicate an approved surface for the virtual object (e.g., surface type, surface size, surface shape, surface orientation, surface height, etc.). For example, a rule may indicate that a virtual object should be placed on a highest detected horizontal surface having at least a particular size (e.g. 5×10 inches, etc.), shape (e.g., rectangular, circular, etc.), and/or type (e.g., table, desk, bookshelf, etc.) in a particular room (e.g., kitchen, den, office, etc.). One or more rules may also indicate approved relationships to other objects in a physical space. For example, a rule may indicate that a virtual object should, or should not, be depicted within a particular distance of one or more other particular physical or virtual objects. As a specific example, a rule may indicate that a virtual object may be placed on a closest horizontal plane to any detected currency (e.g., dollar bill or credit card) in a room. Another rule may indicate that a virtual object may not be placed within 5 meters of a television, door and/or window.

Figure 2:
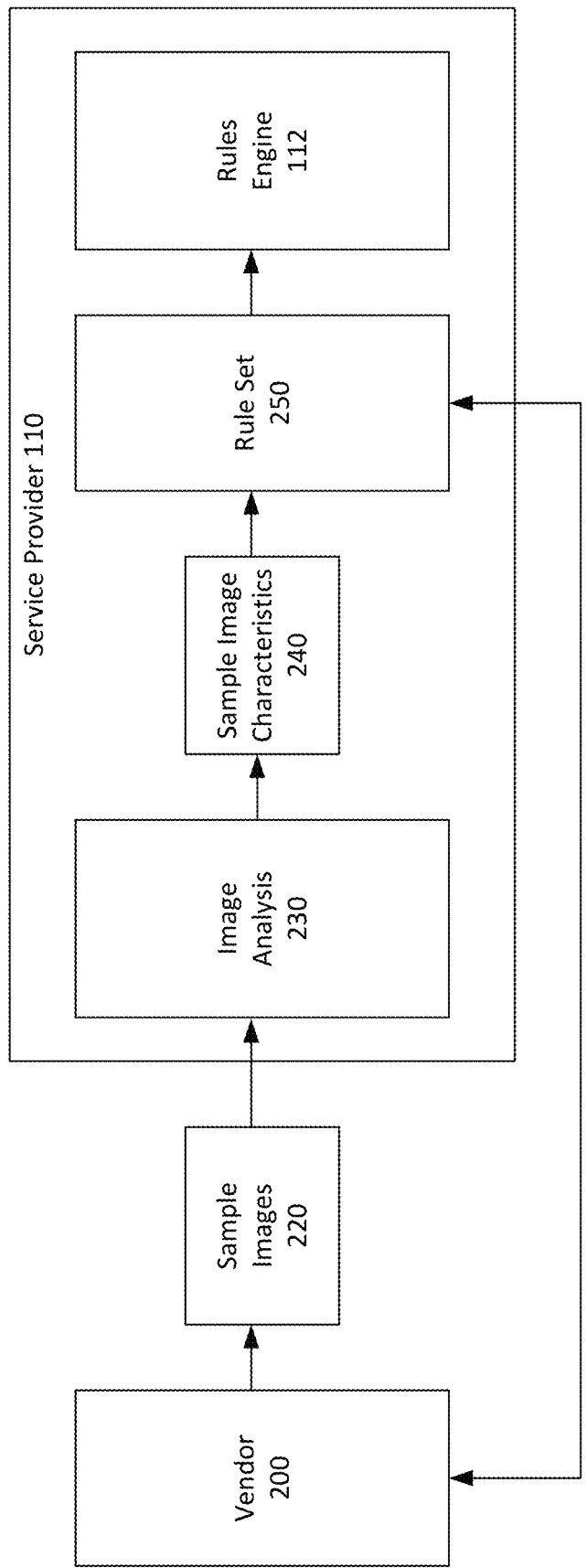
FIG. 2 is a diagram illustrating an example sample image-based rule set determination technique that may be used in accordance with the present disclosure.

The rule sets 105 may be determined using a variety of different techniques. Referring now to FIG. 2, one example rule set determination technique will now be described in detail. In the example of FIG. 2, a vendor 200 provides one or more sample images 220 that show a physical object that is similar or identical to, or that otherwise represents or corresponds to, the virtual object. The sample images may depict sample settings or locations at which the vendor approves of using the physical object, which in turn may be used to determine approved settings or locations at which the corresponding virtual object may be used. In particular, as shown in FIG. 2, the sample images 220 may be provided to image analysis components 230, which may include one or more computer-executed components, such as may be used to determine sample image characteristics 240, such as characteristics of the locations and settings of the physical object in the sample images 220. In some examples, the image analysis components 230 may employ various object recognition techniques to recognize the physical object as well as one or more objects that surround the physical object in each of the sample images 220. In some examples, the physical object may be recognized in the sample images 220 based at least in part on the visual characteristics of the respective virtual object to which it corresponds. Additionally, in some examples, the object recognition techniques may be employed to recognize and classify objects that surround the physical object in the sample images 220. In some examples, this may allow an approved context for the respective virtual object to be determined. For example, if the physical object is surrounded by a couch and a television in one or more sample images 220, then it may be determined that the physical object is located in a den—and that a den is therefore an approved context for the virtual object to which the physical object corresponds. As another example, if the physical object is surrounded by a refrigerator and a sink in one or more sample images 220, then it may be determined that the physical object is located in a kitchen—and that a kitchen is therefore an approved context for the virtual object to which the physical object corresponds. Additionally, in some examples, one or more surface detection and/or scaling techniques may be employed to determine characteristics of the physical object (e.g., size, shape, etc.) as well as characteristics of surfaces on which the physical object is positioned in the sample images 220, such as surface type, surface size, surface shape, surface orientation, surface height, etc. These may be used to determine characteristics of approved surfaces for the virtual object to which the physical object corresponds. Furthermore, in some examples, distances and other relationships may be determined between the physical object and other objects in the sample images 220, and these may be used to determine approved distances and other relationships to other objects for the virtual object to which the physical object corresponds. For example, if it is determined that the physical object is consistently positioned within 2 feet of a couch in the sample images 220, then it may be determined that the respective virtual object should be rendered to appear to be located within 2 feet of a couch in an augmented physical space.

As shown in FIG. 2, the sample image characteristics 240 may be used to determine a rule set 250 for the respective virtual object, such as by using the above described techniques. In some examples, upon determination of the rule set 250 based on the sample image characteristics 240, the rule set 250 may be provided to the vendor 200 for review. During the review, the vendor 200 may confirm one or more rules that meet the vendor's approval and/or may delete or modify one or more rules that do not meet the vendor's approval. Upon being confirmed, the rule set 250 may be made available to the rules engine 112. It is noted that the sample image analysis process described above and shown in FIG. 2 is merely one example technique for determination of a rule set 250 and that one or more other techniques may additionally or alternatively be employed. For example, in some cases, the vendors 100 may provide a textual or other description of one or more approved locations for the virtual objects, and the description may be parsed to identify various keywords, phrases or other indicators of various rules for use of the virtual objects. In yet other examples, the service provider 110 may request information for determination of the rule sets, such as by issuing one or more queries and/or providing one or more forms, templates or interfaces for entry of rule set information, for example via drop down menus, buttons, checkboxes, or other input controls. In yet other examples, machine learning algorithms may be employed to assist in determination of rule sets. For example, in some cases, a particular virtual object may be correlated to other similar virtual objects having the same visual characteristics, description or other similar qualities as the particular virtual object. The rule sets for those similar virtual objects may then be applied to the particular virtual object, such as by using those rule sets as a starting point or baseline for the rule set of the particular virtual object—and potentially modifying those rule sets using any or all of the techniques set forth above.

In some examples, the sample images 220 of FIG. 2 may additionally or alternatively depict sample settings or locations at which the vendor 200 disapproves of using a particular virtual object. For example, the sample images 220 may show various contexts (e.g., den, kitchen, outdoor settings, etc.) at which vendor 200 wishes to prohibit or discourage use of a virtual object. The sample images may also depict scenarios in which a physical object is positioned at a surface/position that is unsuitable for a corresponding virtual object (e.g., a surface that is too large, too small, too high, tool low, too close to one or more other objects, too far from one or more other objects, etc.). These and other sample image characteristics 240 may be used to determine one or more characteristics of a physical space in which a virtual object may be prohibited or discouraged from being used. Thus, in these and other examples, rule set 250 may include one or more rules indicating one or more characteristics of the physical environment that prohibit use of the virtual object to augment the physical environment. For example, a rule may indicate that a particular virtual object cannot be used in a den or a kitchen. In other examples, a rule may indicate characteristics of a surface and/or position in which a particular virtual object cannot be used, such as a surface that exceeds a maximum size or height, that is smaller or lower than a minimum size or height, that is too close to another specified object, that is too far from another specified object, and many others. Thus, a rule set 250 may include rules relating to using a virtual object to augment a physical environment, which may include rules indicating characteristics of a physical environment at which a virtual object is approved for use as well as rules indicating characteristics of a physical environment at which a virtual object is prohibited from use.

Referring back to FIG. 1, it is shown that rule sets 105 may be determined for a group of available virtual objects 111. As will now be described in detail, the rule sets 105 may be used to filter the available virtual objects 111, by rules engine 112, in order to determine a sub-group of the available virtual objects, referred to hereinafter as approved virtual objects 120, which are approved for use in association with a particular physical space. For example, FIG. 1 includes a physical space 160, which is a real-world three-dimensional space, such as room (e.g., kitchen, den, office, classroom, industrial setting, etc.), outdoor setting (e.g., park, playground, etc.), or other physical space. Physical space view 145 is a view of the physical space 160, such as an image or video of the physical space 160—or a view of the actual physical space 160 itself, for example as may be seen through eyeglasses and/or a translucent display through which the physical space 160 is viewed. As will also be described in detail below, selected virtual objects 140 may be selected from the approved virtual objects 120 and inserted into the physical space view 145, such as to create an augmented view 150 of the physical space 160, for example in an augmented reality context. In some examples, the selected virtual objects 140 may be inserted into one or more images and or video of the physical space 160. In other examples, the virtual objects may be displayed via eyeglasses and/or a translucent display through which the physical space 160 is viewed.

Figure 3:
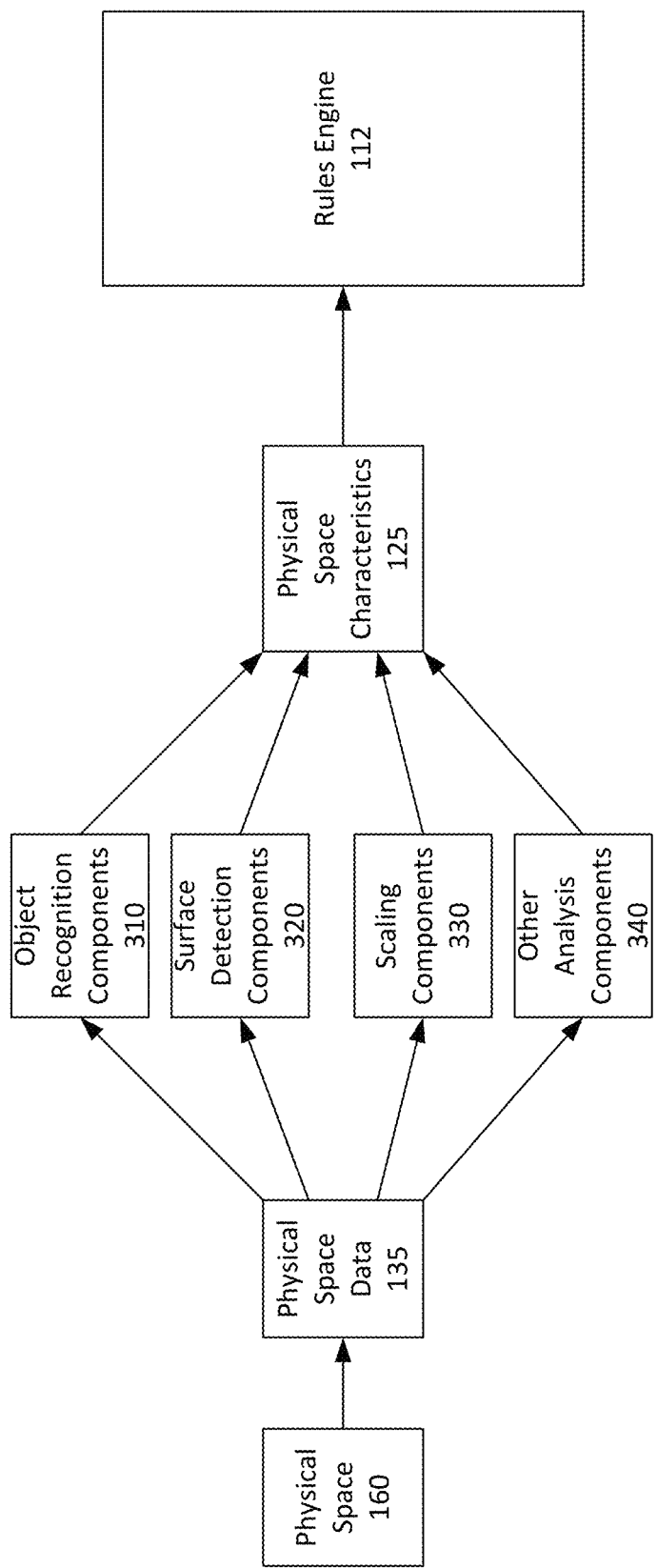
FIG. 3 is a diagram illustrating an example physical space characteristic determination technique that may be used in accordance with the present disclosure.

In the example of FIG. 1, physical space data 135 corresponding to physical space 160 is captured, such as via one or more cameras, sensors or other data capture components. In some examples, the physical space data 135 may include one or more images, image data, and/or other data that identifies attributes of the physical space. The physical space data 135 may be analyzed, for example by one or more computer-executed data analysis processes, to determine physical space characteristics 125, which are characteristics of the physical space 160. Referring now to FIG. 3, some example techniques for determination of the physical space characteristics 125 will now be described in detail. As shown in FIG. 3, physical space data 135 for physical space 160 may be provided to object recognition components 310, such as a service may be operated by the service provider 110. The object recognition components 310 may analyze physical space data 135 to recognize various objects within the physical space, such as faces, furniture, doors, windows, pictures, appliances, buildings, vehicles, elements of nature (trees, rivers, clouds, etc.), and the like. Based at least in part on the recognized objects, one or more contexts associated with the physical space may then be determined. For example, it may be determined that a physical space including a refrigerator and a sink is associated with a kitchen context, that a physical space including a television and a couch is associated with a den context, and that a physical space with a computer, desk and chair is associated with an office context.

As also shown in FIG. 3, physical space data 135 may be analyzed by surface detection components 320 to detect locations and characteristics of surfaces within the physical space 160. For example, surface characteristics such as a location, type, size, shape, orientation, and height of one or more surfaces in the physical space 160 may be determined. Additionally, physical space data 135 may be analyzed by scaling components 330 to determine distances between various objects in the physical space 160, as well as object depths, heights, and other distances or measurements. Furthermore, physical space data 135 may be analyzed other analysis components 340, such as one or more machine learning components, to determine physical space characteristics 125. For example, in some cases, a particular physical space including various objects or other characteristics may be correlated to other analyzed physical spaces having the same or similar characteristics. At least some of the characteristics for those other similar physical spaces may then be applied to the particular physical space that is being analyzed. Thus, in the example of FIG. 3, components 310-340 may be employed to determine physical space characteristics 125, which may be provided to rules engine 112.

Referring back to FIG. 1, it is shown that rules engine 112 may perform rule-based filtering 113 to select, from the available virtual objects 111, a group of approved virtual objects 120 that are approved for use to augment the physical space view 145 of the physical space 160. As part of the rule-based filtering 113, the rules engine 112, may compare the physical space characteristics 125 to the rule sets 105 to determine one or more of the rule sets 105 that are sufficiently satisfied by the physical space characteristics 125. In some examples, one or more of the available virtual objects 111 having respective rule sets 105 that are sufficiently satisfied by the physical space characteristics 125 may then be included in the approved virtual objects 120. By contrast, one or more other of the available virtual objects 111 having respective rule sets 105 that are not sufficiently satisfied by the physical space characteristics 125 may not be included in the approved virtual objects 120. It is noted that it is not necessarily required that physical space characteristics 125 must meet each and every requirement of a rule set in order for the rule set to be considered sufficiently satisfied by the physical space characteristics 125 such that a corresponding virtual object is included in the approved virtual objects 120. For example, in some cases, it may only be necessary for the physical space characteristics 125 to meet a threshold percentage or number of rules for a rule set to be considered sufficiently satisfied by the physical space characteristics 125. In other examples, the approved virtual objects 120 may include virtual objects whose rules sets are not fully satisfied by the physical space characteristics 125—but that instead were closer or closest matches to the physical space characteristics 125 in comparison to the rule sets of other available virtual objects 111. In some examples, an indication may be provided to a user of an extent to which a particular virtual object's rule set is satisfied by the physical space characteristics 125. Also, in some examples, the approved virtual objects 120 may be weighted, ranked, or otherwise ordered relative to one another to indicate a relative extent to which each virtual object's rule set is satisfied by the physical space characteristics 125.

Figure 4:
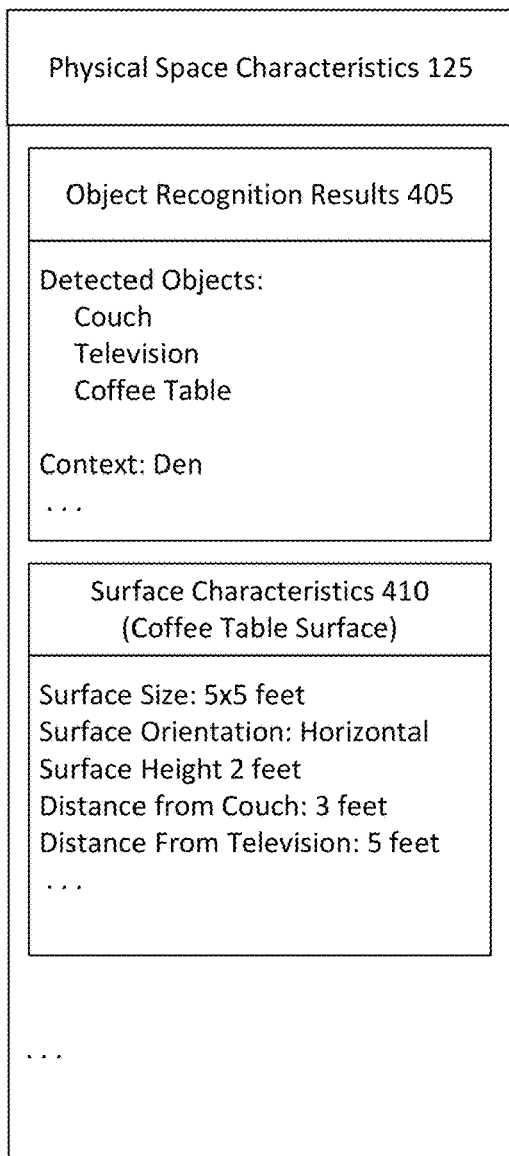
FIG. 4 is a diagram illustrating an example rule set comparison that may be used in accordance with the present disclosure.
Figure 4:
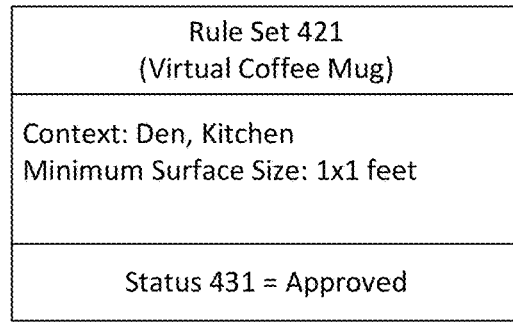
Figure 4:
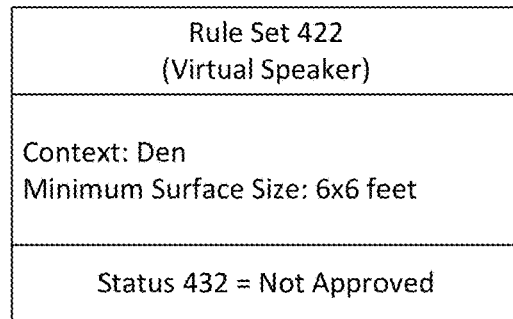
Figure 4:
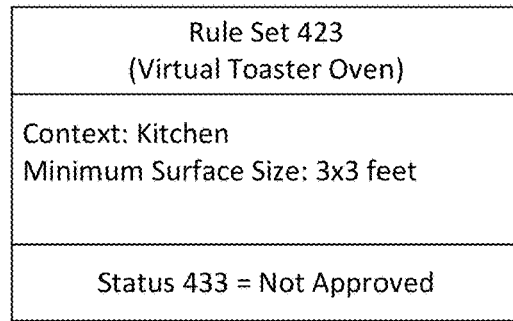
Figure 4:
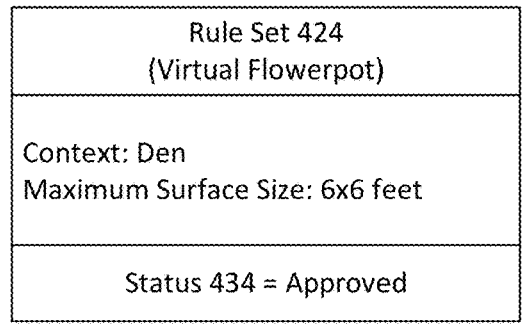
Figure 4:
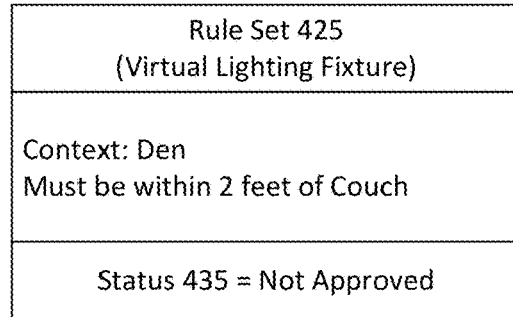

An example of rule-based filtering 113 will now be described in detail with reference to FIG. 4. In particular, in the example of FIG. 4, the physical space characteristics 125 include object recognition results 405 and surface characteristics 410 as well as other characteristics (the various ellipses shown in FIG. 4 indicate that other characteristics may also be determined in addition to those specifically shown in FIG. 4). The object recognition results 405 indicate that, in this example, the physical space 160 includes a couch, a television and a coffee table, for example as may be detected by object recognition components 310 of FIG. 3. The object recognition results 405 further indicate that, based on these detected objects, the context of physical space 160 is determined to be a den. In FIG. 4, the physical space characteristics 125 also include surface characteristics 410, which are characteristics for the surface of the detected coffee table within the physical space (other surface characteristics for other detected surfaces may also be determined, but are not shown in FIG. 4). As shown, the surface characteristics 410 indicate that the coffee table surface has an area of 5×5 feet, is a horizontal surface, has a height of 2 feet, and is positioned 3 feet from the couch and 5 feet from the television.

In the example of FIG. 4, there are five available virtual objects 111 having respective rule sets 421-425. In particular, rule set 421 corresponds to a virtual coffee mug, rule set 422 corresponds to a virtual speaker, rule set 423 corresponds to a virtual toaster oven, rule set 424 corresponds to a virtual flowerpot, and rule set 425 corresponds to a virtual lighting fixture. In this example, each of the rule sets 421-425 may be compared to the physical space characteristics 125 to determine whether each rule set 421-425 is satisfied by the physical space characteristics 125. In particular, rule set 421 indicates that the virtual coffee mug may be used in both den and kitchen contexts, and that a minimum surface size upon which the virtual coffee mug can be placed is 1×1 feet. In this example, because the context of physical space 160 is a den (as indicated in object recognition results 405) and because the coffee table has a surface size of 5×5 feet (as indicated in surface characteristics 410) that exceeds the minimum surface size of 1×1 feet, the rule set 421 is satisfied by the physical space characteristics 125 for the coffee table surface. Also, in this example, because the rule set 421 is satisfied, the virtual object corresponding to rule set 421, which is the virtual coffee mug, is approved for placement on the coffee table surface. FIG. 4 displays a status 431 for the virtual coffee mug, which indicates that the virtual coffee mug is approved—and is therefore included in the approved virtual objects 120 for the coffee table surface.

As another example, rule set 422 indicates that the virtual speaker may be used in a den context, and that a minimum surface size upon which the virtual speaker can be placed is 6×6 feet. In this example, the context of physical space 160 is a den, which satisfies the den requirement of rule set 422. However, the coffee table has a surface size of only 5×5 feet, which is less than the minimum surface size of 6×6 feet in rule set 422. For this reason, the rule set 422 is not satisfied by the physical space characteristics 125 for the coffee table surface. In this example, because the rule set 422 is not satisfied, the virtual object corresponding to rule set 422, which is the virtual speaker, is not approved for placement on the coffee table surface. FIG. 4 displays a status 432 for the virtual speaker, which indicates that the virtual speaker is not approved—and is therefore not included in the approved virtual objects 120 for the coffee table surface.

As another example, rule set 423 indicates that the virtual toaster oven may be used in a kitchen context, and that a minimum surface size upon which the virtual speaker can be placed is 3×3 feet. In this example, the coffee table has a surface size of 5×5 feet, which satisfies the minimum surface size of 3×3 feet in rule set 423. However, the context of physical space 160 is a den, which does not satisfy the kitchen context requirement of rule set 423. For this reason, the rule set 423 is not satisfied by the physical space characteristics 125 for the coffee table surface. In this example, because the rule set 423 is not satisfied, the virtual object corresponding to rule set 423, which is the virtual toaster oven, is not approved for placement on the coffee table surface. FIG. 4 displays a status 433 for the virtual toaster oven, which indicates that the virtual toaster oven is not approved—and is therefore not included in the approved virtual objects 120 for the coffee table surface.

As another example, rule set 424 indicates that the virtual flowerpot may be used in a den context, and that a maximum surface size upon which the virtual flowerpot can be placed is 6×6 feet. In this example, because the context of physical space 160 is a den and because the coffee table has a surface size of 5×5 feet that does not exceed the maximum surface size of 6×6 feet, the rule set 424 is satisfied by the physical space characteristics 125 for the coffee table surface. Also, in this example, because the rule set 424 is satisfied, the virtual object corresponding to rule set 424, which is the virtual flowerpot, is approved for placement on the coffee table surface. FIG. 4 displays a status 434 for the virtual flowerpot, which indicates that the virtual flowerpot is approved—and is therefore included in the approved virtual objects 120 for the coffee table surface.

As another example, rule set 425 indicates that the virtual lighting fixture may be used in a den context and that the virtual lighting fixture must be within 2 feet of a couch. In this example, the context of physical space 160 is a den, which satisfies the den context requirement of rule set 425. However, the coffee table surface is 3 feet away from the couch, which does not satisfy the requirement that the virtual lighting fixture must be within 2 feet of a couch. For this reason, the rule set 425 is not satisfied by the physical space characteristics 125 for the coffee table surface. In this example, because the rule set 425 is not satisfied, the virtual object corresponding to rule set 425, which is the virtual lighting fixture, is not approved for placement on the coffee table surface. FIG. 4 displays a status 435 for the virtual lighting fixture, which indicates that the virtual lighting fixture is not approved—and is therefore bot included in the approved virtual objects 120 for the coffee table surface.

Figure 5:
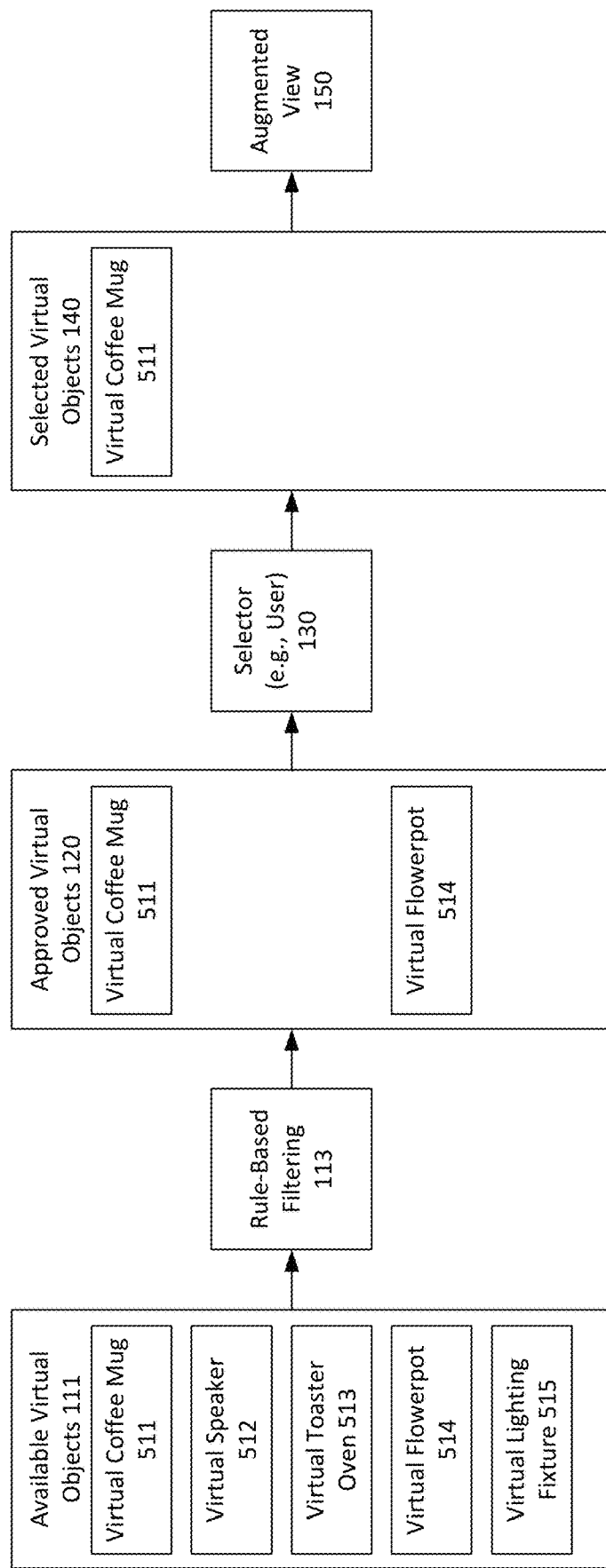
FIG. 5 is a diagram illustrating example rule-based filtering and object selection that may be used in accordance with the present disclosure.

Thus, as shown in the example of FIG. 4, physical space characteristics 125 may be compared to rule sets 421-425 to determine approved virtual objects 120 for use in a physical space 160, such as at a particular surface or other location within the physical space 160 (e.g., the coffee table surface described above). The comparison of physical space characteristics 125 to rule sets 421-425 may be included as part of rule-based filtering 113, an example of which will now be described in detail with reference to FIG. 5. In particular, in the example of FIG. 5, available virtual objects 111 may include virtual coffee mug 511, virtual speaker 512, virtual toaster oven 513, virtual flowerpot 514, and virtual lighting fixture 515, which correspond to rule sets 421-425 of FIG. 4, respectively. As shown in FIG. 5, rule-based filtering 113 is used to determine approved virtual objects 120 from the available virtual objects 111. In this example, the approved virtual objects 120 are approved for use at the coffee table surface of physical space 160 described above. In particular, using the comparison shown in FIG. 4, it is seen that the approved virtual objects 120 include virtual coffee mug 511 and virtual flowerpot 514, as indicated by the approved statuses 431 and 434 of FIG. 4, respectively. As was also shown in the example of FIG. 4, virtual speaker 512, virtual toaster oven 513 and virtual lighting fixture 515 are not approved for use with the coffee table surface, as indicated by the not approved statuses 432, 433 and 435, respectively, and are therefore not included in approved virtual objects 120 in FIG. 5.

Next, as shown in FIGS. 1 and 5, a selector 130, such as a user, may select one or more selected virtual objects 140 from the group of approved virtual objects 120 for use in augmenting physical space view 145 to form augmented view 150. In particular, in the example of FIG. 5, the selector 130 has selected virtual coffee mug 511 for insertion into the augmented view 150. In this example, because the virtual coffee mug 511 is selected for use at the coffee table surface, the virtual coffee mug may be inserted and positioned in the augmented view 150 on the coffee table surface. It is noted that, while FIGS. 4-5 show an example object selection for the coffee table surface, the processes described in FIGS. 4-5 may be repeated for other detected surfaces or locations within the physical space 160. For example, in some cases, additional surfaces could be detected within the physical space 160, such as an end table surface, a bookshelf surface, an entertainment center surface, etc. The processes of FIGS. 4 and 5 could then be repeated to determine one or more approved virtual objects 120 and selected virtual objects 140 to insert and position at those additional surfaces/locations within the augmented view 150.

It is further noted that, in addition or as an alternative to being selected by a user, other selector(s) 130 may also be employed to select the selected virtual objects 140 from the approved virtual objects 120. For example, in some cases, the selected virtual objects 140 may be determined by assigning various priorities or weights to the virtual objects, for example with the higher prioritized or higher weighted objects being selected over the lower prioritized or lower weighted virtual objects. As set forth above, the priorities or weights may, in some cases, correspond to an extent to which the approved virtual objects 120 have rule sets that are satisfied by the physical space characteristics 125. Also, in some examples, the priorities or weights may be assigned by a computer-executed process, such as a machine learning analysis, which may for example determine which virtual objects tend to be selected most frequently and/or with higher satisfaction rates at various different contexts, surfaces, locations, etc.

Figure 6:
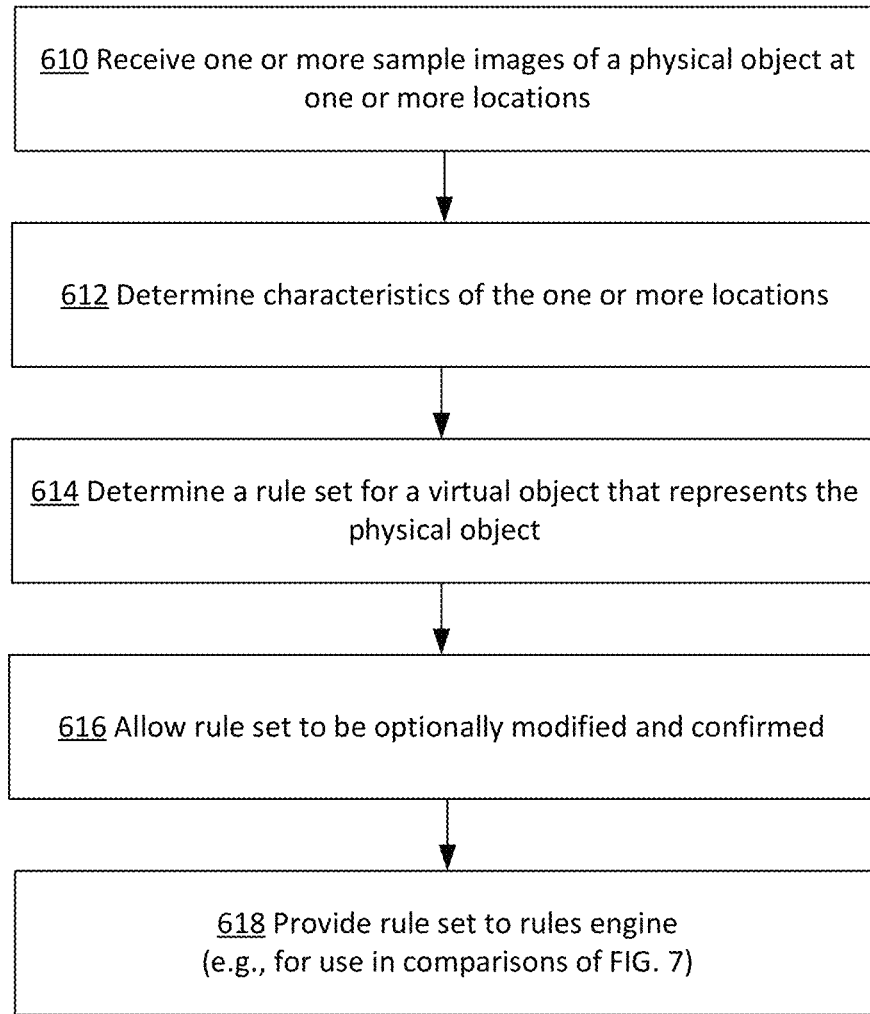
FIG. 6 is a flowchart illustrating an example process for sample image-based rule set determination that may be used in accordance with the present disclosure.

Thus, as described above, rule sets may be used to determine approved virtual objects, from which one or more virtual objects may be selected for augmentation of a physical space. As also described above, a rule set for a virtual object may, in some examples, be determined based on sample images of a physical object to which the virtual object corresponds. Referring now to FIG. 6, an example sample image-based rule set determination process will now be described in detail. In particular, the process of FIG. 6 is initiated at operation 610, at which one or more sample images of a physical object at one or more locations are received. As set forth above, the sample images may, for example, be received by a service provider from a vendor. In some examples, the vendor may offer the physical object for sale or may otherwise manufacture or provide the physical object. The sample images may depict sample settings or locations at which the vendor approves of using the physical object, which in turn may be used to determine approved settings or locations at which a corresponding virtual object, which represents the physical object, may be used.

At operation 612, one or more characteristics of the one or more locations is determined based on the one or more sample images. As set forth above, one or more computer-executed image analysis processes may be performed on the sample images to determine characteristics of the locations and settings of the physical object in the sample images. For example, operation 612 may include performing an object recognition analysis to detect the physical object and one or more other objects in the one or more sample images, such as objects that are adjacent to the physical object. Additionally, in some examples, the object recognition analysis may be employed to recognize and classify the other objects. In some examples, operation 612 may include determining a context of the one or more locations based, at least in part, on the one or more other objects. For example, if the physical object is surrounded by a couch and a television in one or more sample images, then it may be determined that the physical object is located in a den. As another example, if the physical object is surrounded by a refrigerator and a sink in one or more sample images, then it may be determined that the physical object is located in a kitchen. Additionally, in some examples, operation 612 may include determining a distance or other relationships between the physical object and the one or more other objects. These may be used to determine approved distances and other relationships to other objects for the virtual object to which the physical object corresponds. Furthermore, in some examples, operation 612 may include determining characteristics of one or more surfaces on which the physical object is positioned in the one or more sample images, such as surface area, size, shape, orientation, height, type, etc. These may be used to determine characteristics of approved surfaces for the virtual object to which the physical object corresponds.

At operation 614, a rule set is determined for the virtual object that represents the physical object. In particular, the rule set may include one or more rules for and/or related to using the virtual object to augment a physical environment. The one or more rules for and/or related to using the virtual object to augment a physical environment may be generated and/or determined based on the one or more first characteristics of the one or more locations determined at operation 612. For example, the rule set may include a rule indicating a context of the physical environment for insertion of the virtual object. For example, if the physical object is surrounded by a couch and a television in one or more sample images, then it may be determined that the physical object is located in a den—and that a den is therefore an approved context for the virtual object to which the physical object corresponds. As another example, if the physical object is surrounded by a refrigerator and a sink in one or more sample images, then it may be determined that the physical object is located in a kitchen—and that a kitchen is therefore an approved context for the virtual object to which the physical object corresponds. The rule set may also include a rule indicating insertion of the virtual object relative to one or more other objects detected within the physical environment. For example, if it is determined that the physical object is consistently positioned within 2 feet of a couch in the sample images, then it may be determined that the respective virtual object should be rendered to appear to be located within 2 feet of a couch in an augmented physical space. As another example, the rule set may also include a rule indicating a characteristic of a surface for insertion of the virtual object within the physical environment, such as based on characteristics of detected surfaces upon which the physical object was positioned in the sample images.

At operation 616, the rule set may be allowed to be optionally modified and confirmed, such as by a vendor or other user that provides the sample images. For example, the rules, or indications thereof, may be provided to the vendor, such as through one or more interfaces. The vendor 200 may confirm one or more rules that meet the vendor's approval and/or may delete or modify one or more rules that do not meet the vendor's approval. Additionally, the vendor may also add additional rules that may not have been determined by the image analysis-based process described above. Upon being confirmed, the rule set may be provided to the rules engine 112. As set forth above, the rules engine may be compare the rule set to one or more characteristics of a physical space, such as to determine whether the virtual object is approved for use to augment the physical space.

Figure 7:
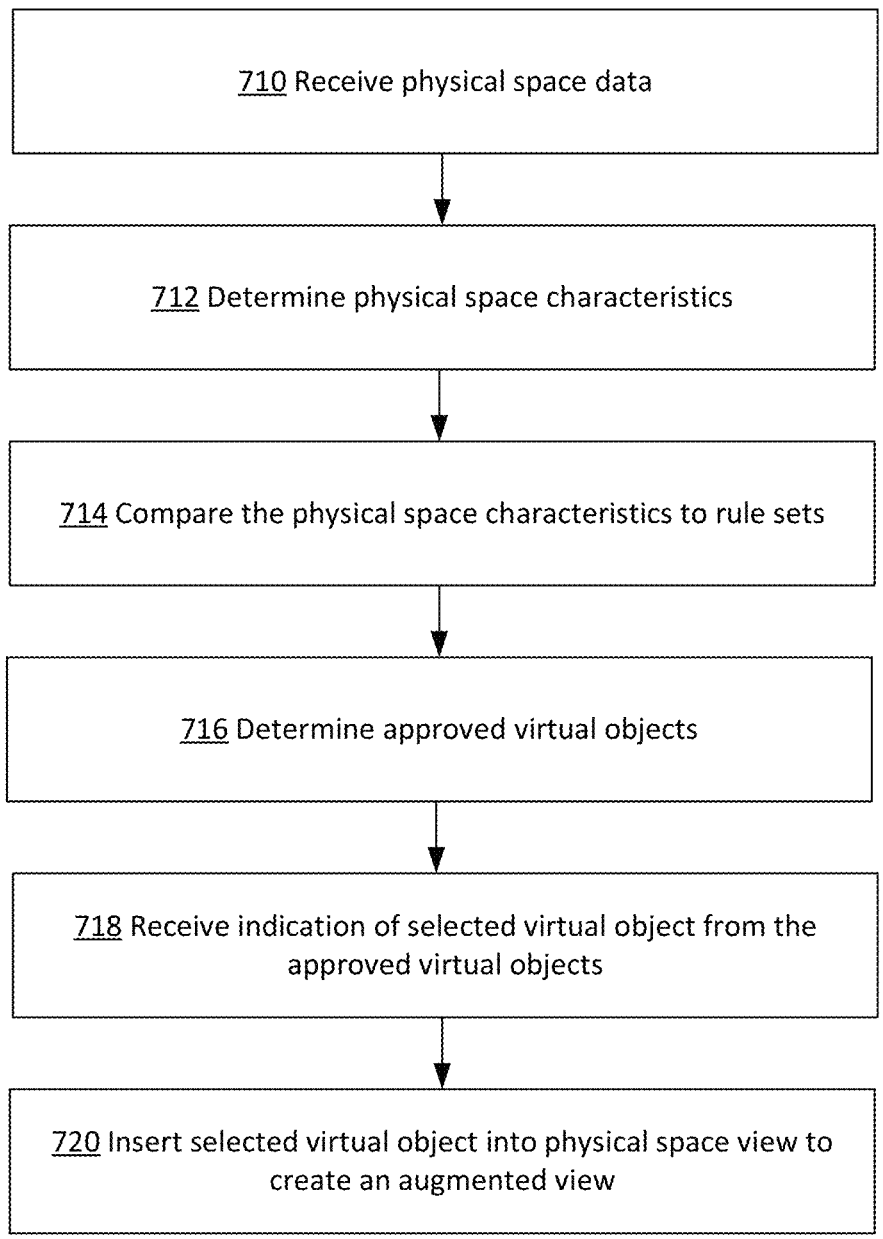
FIG. 7 is a flowchart illustrating an example process for rule-based augmentation of a physical environment that may be used in accordance with the present disclosure.

Thus, rule sets for virtual objects may be determined using techniques such as those described above with reference to FIG. 6. An example process for using rule sets to determine virtual objects that are approved for use to augment a particular physical space will now be described in detail with reference to FIG. 7. In particular, the process of FIG. 7 is initiated at operation 710, at which physical space data, which is data representative of a physical space, is received. As set forth above, the physical space data may be captured, such as via one or more cameras, sensors or other data capture components. In some examples, the physical space data may include one or more images of the physical space, image data, and/or other data that identifies attributes of the physical space.

At operation 712, one or more characteristics of the physical space are determined, for example based at least in part on the physical space data. As set forth above, the physical space data may be analyzed, for example by one or more computer-executed data analysis processes, to determine the physical space characteristics. In some examples, operation 712 may include determining a type of object in the physical space and/or a context of the physical space, such as based at least in part on an object recognition analysis. For example, an object recognition analysis may be performed on the physical space data to recognize various types of objects within the physical space, such as faces, furniture, doors, windows, pictures, appliances, buildings, vehicles, elements of nature (trees, rivers, clouds, etc.), and the like. Based at least in part on the recognized objects, one or more contexts associated with the physical space may then be determined. For example, it may be determined that a physical space including a refrigerator and a sink is associated with a kitchen context—or that a physical space including a television and a couch is associated with a den context. Also, in some examples, operation 712 may include determining a characteristic of a surface detected in the physical space. For example, a surface detection analysis may be performed on the physical space data to detect locations and characteristics of surfaces within the physical space. Surface characteristics such as a location, type, size, shape, orientation, and height of one or more surfaces in the physical space may be determined. Additionally, operation 712 may include determining distances between various objects in the physical space, as well as object depths, heights, and other distances or measurements.

At operation 714, the characteristics of the physical space are compared to one or more rule sets. For example, as described above, for each virtual object in a group of available virtual objects (e.g., available virtual objects 111 of FIG. 1), a respective rule set may be determined that corresponds to the virtual object and that includes one or more rules for using the virtual object to augment a physical environment. As described above, the characteristics of the physical space may be compared to the rule sets to determine one or more rule sets that are sufficiently satisfied by the characteristics of the physical space, such as rule sets in which all rules are satisfied by the characteristics of the physical space, rule sets in which a threshold percentage or other threshold amount of rules are satisfied by the characteristics of the physical space, and/or rule sets that determined to be closest matches to being satisfied by the characteristics of the physical space (e.g., as compared to other rule sets for the available virtual objects). For example, as described above, a rule regarding a physical space context may be satisfied when the physical space characteristics indicate that the physical space has the same context as the context specified by the rule. As another example, a rule regarding a surface characteristic for placement of a virtual object may be satisfied when the physical space characteristics indicate that a surface in the physical space satisfies one or more surface characteristics specified by the rule. Other example rule set comparisons are described in detail above and are not repeated here.

At operation 716, one or more approved virtual objects (e.g., approved virtual objects 120 of FIG. 1) are determined. As set forth above, the approved virtual objects are objects that are approved for use in augmenting the physical space. As also set forth above, the approved virtual objects may be determined based, at least in part, on the comparing of the physical space characteristics and the rule sets performed at operation 714. In some examples, the approved virtual objects may be a group of virtual objects that are determined from a plurality of virtual objects (e.g., the available virtual objects) and that are associated with the one or more characteristics of the physical space. The group of virtual objects may be associated with the one or more characteristics of the physical space by one or more rules respectively associated with each virtual object of the group of virtual objects. As set forth above, the approved virtual objects may include virtual objects whose rule sets are sufficiently satisfied by the characteristics of the physical space, such as by being fully satisfied, satisfied beyond a threshold amount, being a closest match (e.g., relative to other rules sets), or by other means. As a specific example, as shown in FIG. 5, the approved virtual objects 120 may include a virtual coffee mug 511 and a virtual flowerpot 514 from the available virtual objects 111. By contrast, virtual speaker 512, virtual toaster oven 513 and virtual lighting fixture 515 are not included in approved virtual objects 120 in FIG. 5.

At operation 718, an indication of a selected virtual object from the approved virtual objects may be received. As set forth above, in some examples, indications of the approved virtual objects may be provided to a user, and the user may select one or more of the approved virtual objects to be selected virtual objects that are used to augment a view of the physical space. In some examples, a list of the approved virtual objects and/or preview images of the approved virtual objects may be provided to the user. In some examples, a user may click-on or otherwise select a particular surface or other location in an image or other view of the physical space, and a list of virtual objects that are approved for the selected surface or location may then be provided to the user, from which the user may select a particular virtual object to be inserted at the selected surface or location. For example, a user could click on a coffee table surface in an image of a physical space to see that a virtual coffee mug 511 and a virtual flowerpot 514 are approved for placement on the coffee table surface. In some examples, selectable preview images of the virtual coffee mug 511 and the virtual flowerpot 514 could be displayed on the coffee table surface. The user could select the virtual coffee mug 511 for insertion onto the coffee table surface. In some examples, this may include selecting a preview image of the virtual coffee mug 511 or selecting the virtual coffee mug 511 from a drop down menu or other selectable interface. Thus, based at least in part on the comparing of operation 714, it may be determined to use a selected virtual object to augment the physical space. For example, determining to use a selected virtual object to augment the physical space may include determining approved virtual objects that have respective rule sets that are satisfied by the one or more characteristics of the physical space, providing, to a user, an indication of the approved virtual objects, and receiving, from the user, a selection of the virtual object from the approved virtual objects.

At operation 720, the selected virtual object may be inserted into a view of the physical space (e.g., physical space view 145 of FIG. 1) to create an augmented view of the physical space (e.g., augmented view 150 of FIG. 1). As set forth above, in some examples, the augmented view of the physical space may include the selected virtual object overlaid over an image of the physical space. Also, in some examples, the augmented view of the physical space may include the selected virtual object overlaid over the physical space itself, such as via a translucent display.

Figure 8:
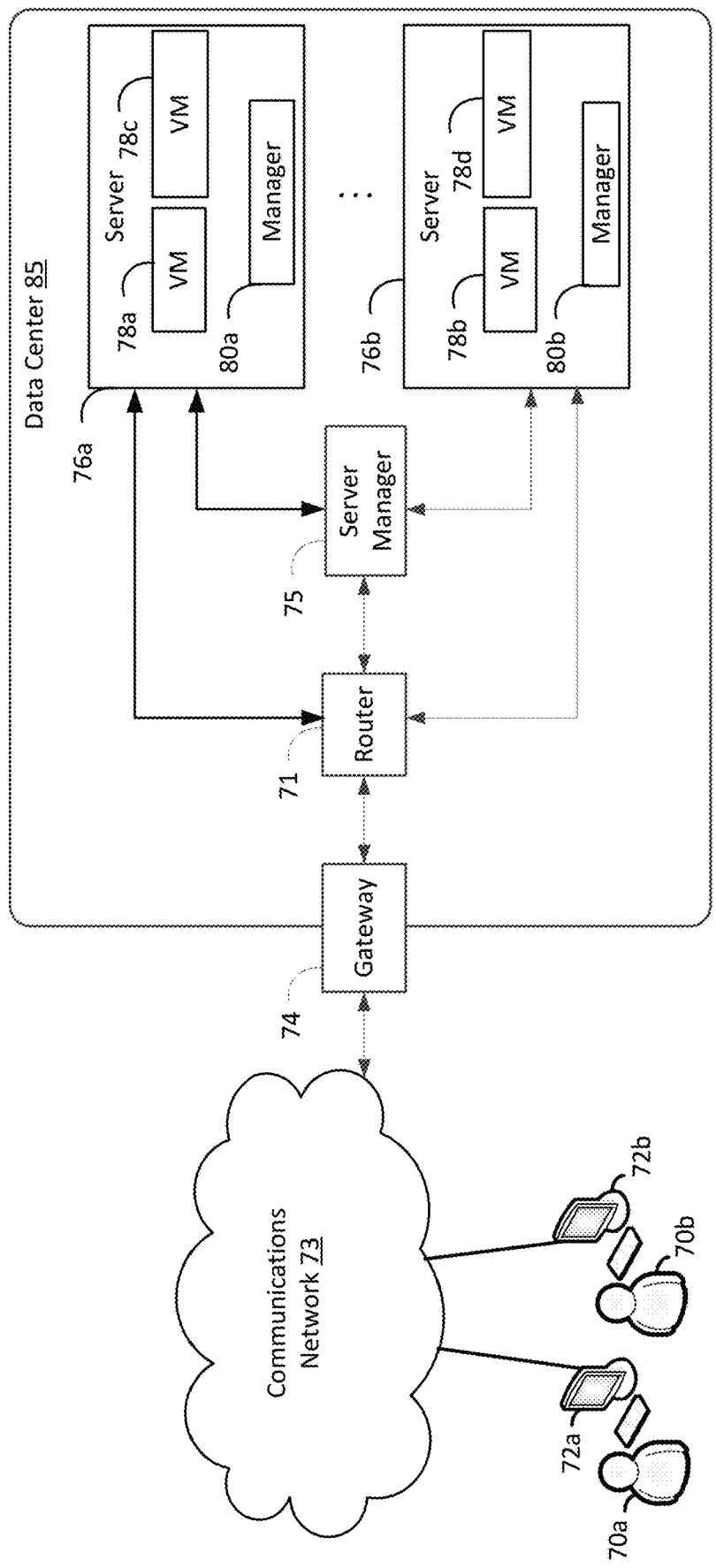
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
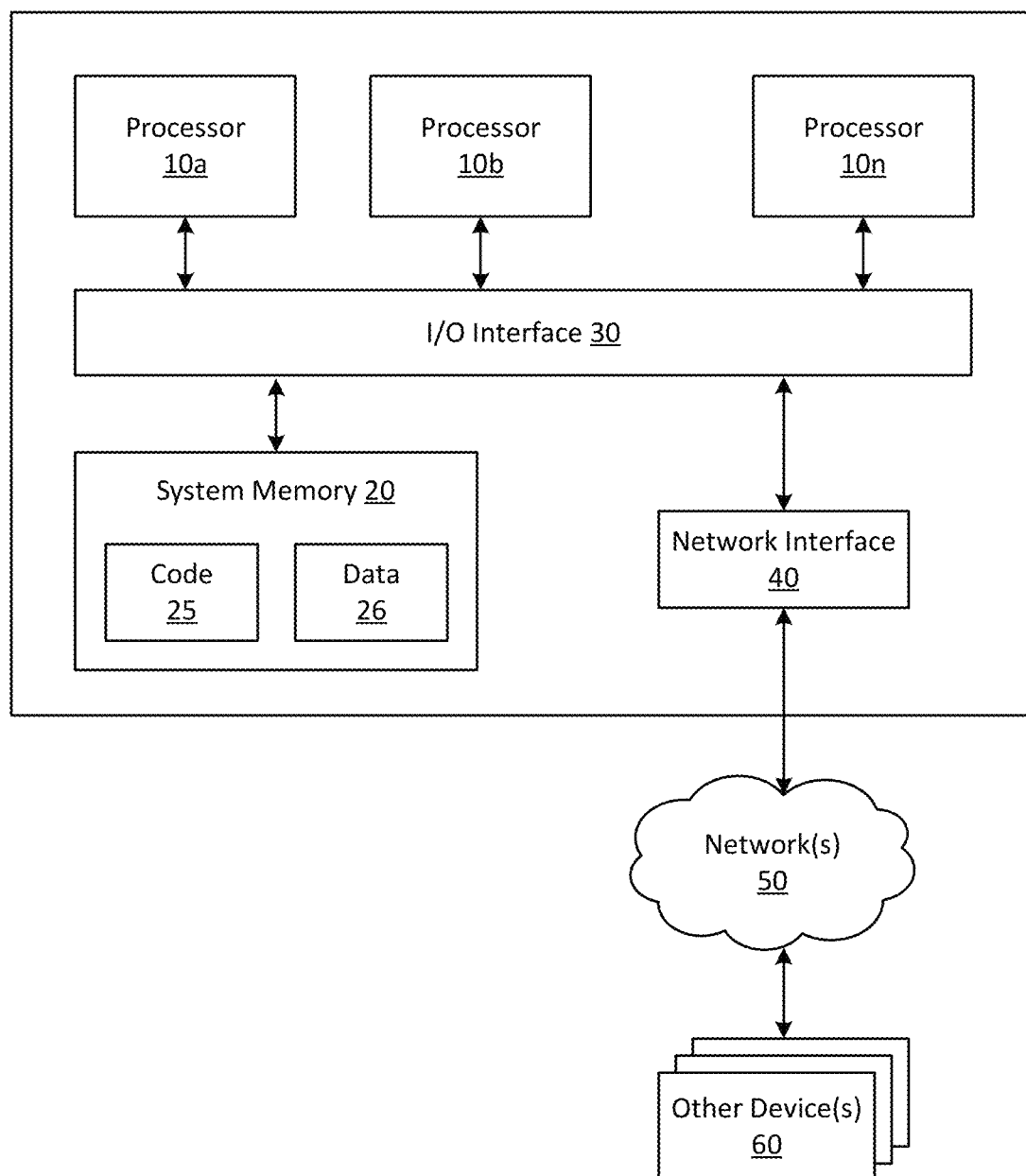
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more computer processors; and
   one or more memories having stored therein instructions that, upon execution by the one or more computer processors, cause the computing system to perform operations comprising:
   determining a rule set corresponding to a virtual object, the rule set including one or more rules relating to using the virtual object to augment a physical environment;
   receiving data representative of a physical space;
   determining one or more characteristics of the physical space;
   comparing the one or more characteristics of the physical space to the rule set;
   based at least in part on the comparing, determining to include the virtual object in a group of virtual objects having rule sets satisfied by the characteristics of the physical space;
   receiving a selection of the virtual object from the group of virtual objects having rule sets satisfied by the characteristics of the physical space to use the virtual object to augment the physical space; and
   inserting the virtual object into a view of the physical space to create an augmented view of the physical space.

2. The computing system of claim 1, wherein determining to use the virtual object to augment the physical space comprises:
   providing, to a user, an indication of the group of virtual objects; and
   receiving, from the user, the selection of the virtual object from the group of virtual objects.

3. The computing system of claim 1, wherein the rule set includes a rule indicating a characteristic of a surface for insertion of the virtual object.

4. The computing system of claim 1, wherein the rule set includes a rule indicating insertion of the virtual object relative to one or more detected objects.

5. The computing system of claim 1, wherein the rule set includes a rule indicating a physical environment context for insertion of the virtual object.

6. The computing system of claim 1, wherein the rule sets include a rule indicating that the one or more characteristics of the physical space prohibit use of another virtual object to augment the physical space.

7. A computer-implemented method comprising:
   receiving data representative of a physical space;
   determining one or more characteristics of the physical space;
   determining, from a plurality of virtual objects, a group of virtual objects having rule sets that are satisfied by the one or more characteristics of the physical space;
   receiving an indication of a selected virtual object from the group of virtual objects having rule sets that are satisfied by the one or more characteristics of the physical space; and
   inserting the selected virtual object into a view of the physical space to create an augmented view of the physical space.

8. The computer-implemented method of claim 7, wherein one or more rules associated with the selected virtual object include a rule indicating a characteristic of a surface for insertion of the selected virtual object.

9. The computer-implemented method of claim 7, wherein one or more rules associated with the selected virtual object include a rule indicating insertion of the selected virtual object relative to one or more detected objects.

10. The computer-implemented method of claim 7, wherein the rule sets include a rule indicating that the one or more characteristics of the physical space prohibit use of another virtual object to augment the physical space.

11. The computer-implemented method of claim 7, wherein one or more rules associated with the selected virtual object include a rule indicating a physical environment context for insertion of the selected virtual object.

12. The computer-implemented method of claim 7, wherein determining one or more characteristics of the physical space comprises determining a characteristic of a surface detected in the physical space.

13. The computer-implemented method of claim 7, wherein determining one or more characteristics of the physical space comprises determining a context of the physical space based at least in part on an object recognition analysis.

14. The computer-implemented method of claim 7, wherein determining one or more characteristics of the physical space comprises detecting a type of an object in the physical space based at least in part on an object recognition analysis.

15. The computer-implemented method of claim 7, wherein the augmented view of the physical space includes the selected virtual object overlaid over an image of the physical space.

16. The computer-implemented method of claim 7, wherein the augmented view of the physical space includes the selected virtual object overlaid over the physical space itself via a translucent display.

17. One or more non-transitory computer-readable storage media having stored thereon instructions that, upon execution by one or more computing devices, cause the one or more computing devices to perform operations comprising:
   receiving data representative of a physical space;
   determining one or more characteristics of the physical space;
   determining, from a plurality of virtual objects, a group of virtual objects having rule sets that are satisfied by the one or more characteristics of the physical space;
   receiving an indication of a selected virtual object from the group of virtual objects having rule sets that are satisfied by the one or more characteristics of the physical space; and
   inserting the selected virtual object into a view of the physical space to create an augmented view of the physical space.

18. The one or more non-transitory computer-readable storage media of claim 17, wherein one or more rules associated with the selected virtual object include a rule indicating a characteristic of a surface for insertion of the selected virtual object.

* * * * *